(12) United States Patent
Legner

(10) Patent No.: US 7,243,755 B2
(45) Date of Patent: Jul. 17, 2007

(54) DRIVE MECHANISM FOR A MOBILE VEHICLE

(75) Inventor: Jürgen Legner, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 369 days.

(21) Appl. No.: 10/900,661

(22) Filed: Jul. 28, 2004

(65) Prior Publication Data

US 2006/0021817 A1 Feb. 2, 2006

(51) Int. Cl.
*B60K 17/356* (2006.01)

(52) U.S. Cl. .................... 180/307; 180/305

(58) Field of Classification Search ............ 180/305, 180/307, 308, 242; 60/483, 494
See application file for complete search history.

(56) References Cited

U.S. PATENT DOCUMENTS

| 3,465,616 | A | | 9/1969 | Schou |
| 3,990,327 | A | | 11/1976 | Margolin |
| 4,069,886 | A | | 1/1978 | Campbell et al. |
| 4,354,400 | A | | 10/1982 | Baker |
| 4,561,250 | A | * | 12/1985 | Aoyagi et al. .............. 60/430 |
| 4,653,271 | A | | 3/1987 | Reeves et al. |
| 5,159,992 | A | * | 11/1992 | Reinecke et al. .......... 180/307 |
| 5,388,450 | A | | 2/1995 | Hurth |
| 5,394,771 | A | | 3/1995 | Schroder |
| 5,473,895 | A | * | 12/1995 | Bausenhart et al. ......... 60/448 |
| 5,617,764 | A | | 4/1997 | Komura et al. |
| 5,766,107 | A | | 6/1998 | Englisch |
| 5,848,565 | A | | 12/1998 | Thoma |
| 5,887,674 | A | * | 3/1999 | Gray, Jr. ................... 180/307 |
| 6,145,312 | A | | 11/2000 | Hauser et al. |
| 6,336,518 | B1 | * | 1/2002 | Matsuyama ............... 180/306 |
| 6,367,572 | B1 | | 4/2002 | Maletschek et al. |
| 6,508,328 | B1 | * | 1/2003 | Kenyon et al. ............ 180/308 |
| 6,622,594 | B2 | | 9/2003 | Ikari et al. |
| 6,644,429 | B2 | * | 11/2003 | Evans et al. ............... 180/307 |
| 6,675,576 | B2 | | 1/2004 | Bigo et al. |
| 6,758,290 | B2 | * | 7/2004 | Jolliff et al. .............. 180/6.48 |
| 6,849,028 | B2 | | 2/2005 | Nakatani et al. |
| 7,070,531 | B2 | | 7/2006 | Ishizaki |
| 7,082,760 | B2 | | 8/2006 | Legner et al. |
| 2004/0231907 | A1 | * | 11/2004 | Ishii ........................ 180/307 |
| 2006/0021817 | A1 | * | 2/2006 | Legner ..................... 180/307 |
| 2006/0021818 | A1 | * | 2/2006 | Legner ..................... 180/307 |

FOREIGN PATENT DOCUMENTS

| DE | 1 132 450 | 1/1963 |
| DE | 1 901 959 | 10/1977 |
| DE | 39 07 633 A1 | 9/1990 |
| DE | 39 07 633 C2 | 7/1992 |
| DE | 196 24 534 A1 | 1/1998 |
| DE | 198 27 130 A1 | 12/1999 |
| DE | 100 34 752 A1 | 8/2002 |
| EP | 0 483 543 A1 | 5/1992 |
| GB | 1 288 508 | 9/1972 |
| WO | WO 99/17021 | 4/1999 |

* cited by examiner

*Primary Examiner*—J. Allen Shriver
(74) *Attorney, Agent, or Firm*—Davis Bujold & Daniels, P.L.L.C.

(57) ABSTRACT

A drive mechanism for a mobile vehicle has one first hydraulic motor (9) and one second hydraulic motor (10) which are in permanent operative connection via a summarizing transmission (12, 14) and drive one output shaft (17). In order to make possible, driving a first hydromotor (9) above its admissible maximum rotational speed, the first hydromotor (9) is adjusted to zero displacement and hydraulically separated form the high pressure.

17 Claims, 2 Drawing Sheets

DRIVE MECHANISM FOR A MOBILE VEHICLE

FIELD OF THE INVENTION

The invention relates to a drive mechanism for a mobile vehicle.

BACKGROUND OF THE INVENTION

Generic drive mechanisms are specially used for driving mobile vehicles such as working machines like wheel loaders. At low speed wheel loaders require high tractions and preferably a terminal speed of 40 km/h. In a first driving range, the working range, gear shifts are an obstacle since those gear shifts are time consuming and thus prolong the load cycle.

DE 39 07 633 C2 discloses a continuously variable hydrostatic drive system in which one output shaft is driven by a first hydromotor via a first transmission part and a second hydromotor via a second transmission part, likewise, drives the output shaft. In a first driving range, both transmission parts are connected with the output shaft so that the torque of both hydromotors acts upon the output shaft. By changing the displacement of one hydromotor, the output rotational speed can be additionally changed for changing the displacement of the pump. But this is possible only up to a maximum rotational speed of the hydromotors. For this reason, there is the reduction gear part of the second motor between a mechanical separating device which, upon reaching the maximum rotational speed of the hydromotor, separates it from the output shaft so that the other hydromotor can further be accelerated up to its maximum rotational speed. Before the separating device can be opened, the motor has to be adjusted to a displacement of nearly zero. But the coupling and uncoupling of the motor produces a shift jerk.

The problem on which this invention is based is to provide a drive mechanism for a mobile vehicle where, in a first driving range, the torque of two hydromotors acts upon the output shaft and where, in another driving range, the torque of only one hydromotor acts upon the output shaft whereby the shift jerk is to be minimized and the transmission simply constructed.

The problem is solved with a drive mechanism for mobile vehicles.

SUMMARY OF THE INVENTION

According to the invention, a first hydraulic motor is permanently connected with the output shaft via a first reduction gear part and another hydromotor, likewise, via another reduction gear part. The ratios of the transmission parts can be equal, preferably the ratios are different.

In one other embodiment, the first reduction gear part, which is connected with the first hydromotor, comprises one spur gear transmission, the output shaft of the hydromotor driving a first spur gear, which is operatively connected with a second spur gear non-rotatably connected with the output shaft. The second hydromotor drives the second reduction gear part which, likewise, consists of one first spur gear operatively connected with one other spur gear which is non-rotatably connected with the output shaft. It is also possible that the first hydromotor drives a first spur gear and the second hydromotor also drives one spur gear, both spur gears being operatively connected with one common spur gear which is non-rotatably connected with the output shaft.

At least one hydromotor is designed with adjustable displacement, but both hydromotors are preferably of adjustable displacement. To start with a high torque, the pressure-medium supply lines of both hydromotors are connected with the pressure-medium exit of one pump and the hydromotors have a displacement which is above zero. If the flow rate of the pump is now increased, the motors are driven and they, in turn, drive the output shaft via their reduction gear parts. The output shaft is connected with a vehicle wheel which is also driven. If the maximum flow rate of the pump is reached, at least one hydromotor is adjusted in its displacement so that the rotational speed of the output shaft is further increased. This motor and the reduction gear part are preferably laid out so that the motor, when reaching its minimum displacement, achieves its maximum admissible rotational speed when the pressure-medium supply line is loaded with high pressure. The hydromotor is now adjusted to its zero displacement and the pressure-medium supply line is separated from the high pressure of the pump, the pressure medium exit. The pressure-medium supply line and the pressure-medium return line of this hydromotor are connected with the pressure of the suction side of the hydropump or, in case of closed circuit, with the pressure of the feed pump or with the return pressure from radiator to the transmission (tank), the lubrication pressure for the transmission. By the return pressure from the radiator being connected with the motor, the bearing points and seals of the motor are still less loaded, since this pressure is below the feed pressure. By reducing the displacement of the other motor, the rotational speed of the output shaft is further increased whereby the rotational speed of the first hydromotor also increases above its maximum admissible rotational speed. But the first hydromotor can be operated above its maximum admissible rotational speed since it has almost no displacement by the displacement adjusting device having adjusted the displacement to zero and the high pressure no longer abutting on the pressure-medium supply line. The hydromotor is preferably designed as radial piston motor whereby, through adjustment of the displacement to zero, no relative movement at all generates between the pistons and the cylinders, the motor thus having slight friction. When using a radial piston motor with crankshaft, the displacement adjustment is situated within the crankshaft such as in WO 99/17021, which is herein incorporated by reference when the hydromotor is adjusted to zero displacement, the crankshaft rotates concentrically and the pistons thus effect no stroke movement at all. The mechanical displacement adjustment shown in WO 99/17021 can also be hydraulic by the adjusting piston being adjusted via hydraulic pressure. These adjusting pistons are preferably connected with the high pressure whereby the adjustment is effected via the high pressure. But it is also possible to design the hydromotors as axial piston motors or to design the first hydromotor as radial piston motor and the second hydromotor as axial piston motor. At the maximum rotational speed of the output shaft, the first motor is separated from the high pressure, but mechanically connected with the output shaft and at its zero displacement. The second motor is adjusted to its minimum displacement and drives the output shaft. The hydromotors and the reduction are laid out so that the working range of the working machine is reached when the maximum admissible rotational speed of the first hydromotor has been reached. The drive range thus results exclusively via the second hydromotor.

It is obvious to the expert that when changing the flow rate of the pump, the pressure-medium supply line and the pressure-medium return line of the hydromotors turn around, since the pressure-medium return line is now loaded with high pressure and the pressure-medium supply line with low pressure. But when the hydromotor is disengaged, the line conveying the high pressure is always loaded with the low pressure or the return pressure from radiator to tank (transmission), the lubrication pressure, and separated from the high pressure.

In another embodiment, the adjusting device of the displacement is connected via a valve with the shut-off valve whereby, when the pressure-medium supply line is separated from the high pressure, the adjusting device for displacement of the motor is automatically separated from the high pressure and loaded with low pressure. It is thus ruled out that in a separated state, the adjusting device adjusts the hydromotor in direction of larger displacement.

By the motors not being situated upon the output shaft, it is possible to dispose the pressure-medium supply line for adjustment of the displacement in the crankshaft on one side thereof and connected it with the high pressure. The seal can thus be placed upon a small diameter whereby high rotational speeds are possible even with high pressure.

By the first hydromotor and the second hydromotor being in permanent mechanical operative connection with the output shaft and at a maximum rotational speed of the output shaft, one hydromotor being adjusted to zero displacement and its pressure-medium supply line and its pressure-medium return line being connected with the low pressure, the driving system needs no mechanical separating devices whereby no shift jerk can generate. By the motors being supplied with pressure medium also in disengaged state, the cylinders remain filled whereby, likewise, no shift jerk results during engagement.

BRIEF DESCRIPTION OF THE DRAWING(S)

The invention will now be described, by way of example, with reference to the accompanying drawings in which.

DETAILED DESCRIPTION OF THE INVENTION

Figure 1:
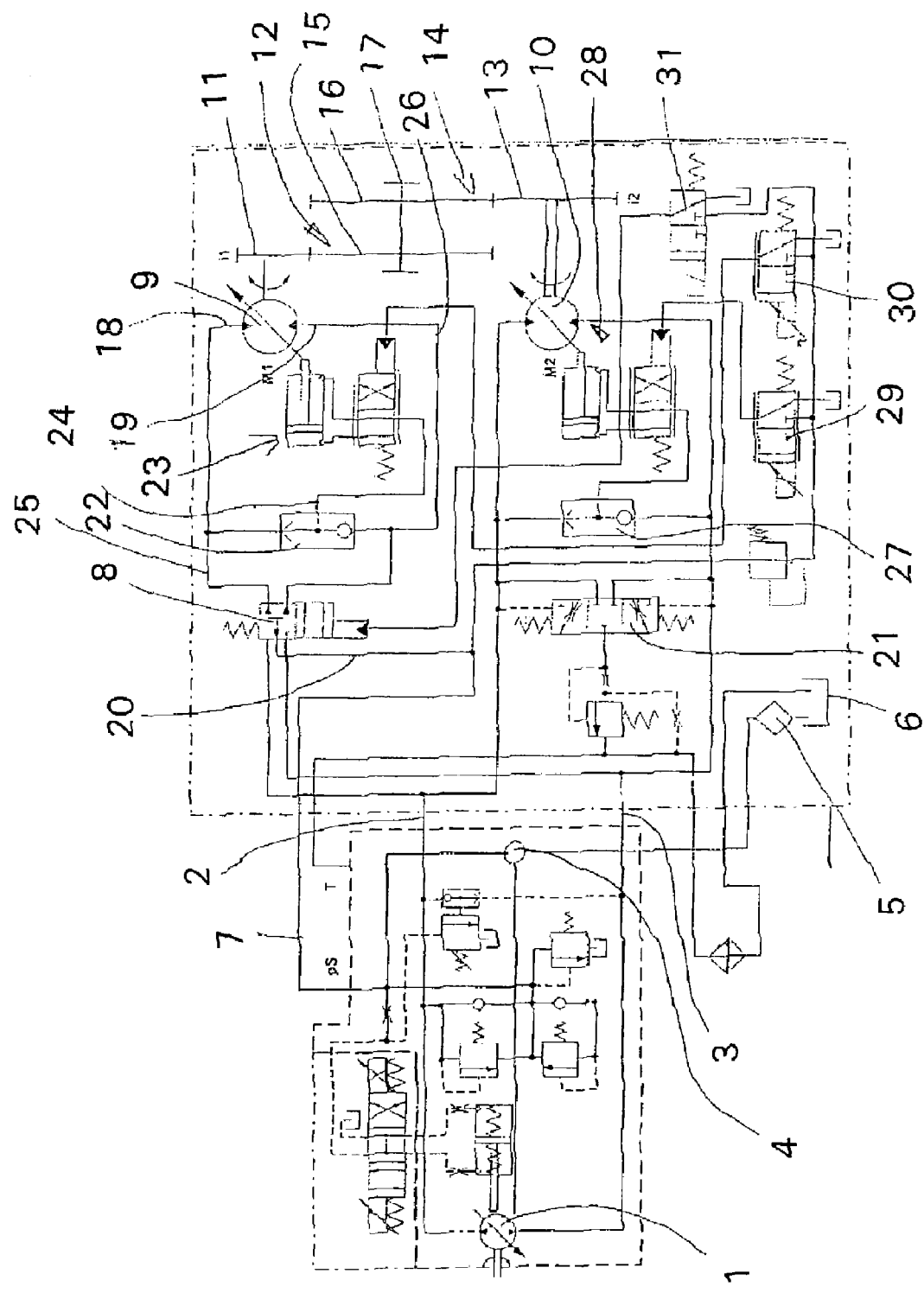
FIG. 1 is a hydraulics and transmission diagram of the drive mechanism.

FIG. 1:

One hydrostatic pump 1, which is variable in displacement and preferably has one electronic, rotational-speed dependent adjustment, conveys pressure medium into a common high-pressure line 2 and sucks it from a common low-pressure line 3. One feed pump 4 sucks, via one filter 5 from a pressure-medium tank 6, which is preferably the transmission housing, and delivers, on one side, to the common low-pressure line 3 and, on the other, to the feed pressure line 7. The common high-pressure line 2 is connected via a first shut-off valve 8 with a first hydromotor 9 and with a second hydromotor 10. The first hydromotor 9 is of an adjustable displacement and drives a first gear wheel 11 of a first reduction gear part 12 and the second hydromotor 10 drives a first gear wheel 13 of a second reduction gear part 14. The first gear wheel 11 drives a second gear wheel 15 and the first gear wheel 13 drives a second gear wheel 16, the second gear wheel 15 and the second gear wheel 16 being non-rotatably connected with an output shaft 17. The output shaft 17 is connected with one vehicle wheel.

The valve 8 has two shift positions, the common high-pressure 2 being connected in a first position with a pressure-medium supply line 18 and a pressure-medium return line 19 with the common low-pressure line 3. In the second shift position of the valve 8, the common high-pressure line 2 is separated from the pressure-medium supply line 18 and the common low-pressure line 3, likewise, from the pressure-medium return line 19. The pressure-medium supply line 18 and the pressure-medium return line 19 are connected with the feed pressure line 7. It is also possible to connect a line 20 with the exit of a flush valve 21 whereby the pressure-medium supply line 18 and the pressure-medium return line 19 are, likewise, loaded with the pressure of the feed pump 4 but, in this shift position, the motor receives the hot oil that leaves the flush valve 21. By the line 20 being connected with the line 7, the motor receives the cool oil of the feed pump 4 in this shift position. One other possibility is to connect the line 20 with a return line 57 from a radiator 56 to the tank 6 whereby the pressure-medium supply line 18 and the pressure-medium return line 19 are loaded with a very low pressure. A valve 22 supplies a displacement adjusting device 23 always with high pressure while the valve 22 connects a line 24 either with a line 25 or a line 26. The valve 22 is situated between the valve 8 and the first hydromotor 9 and thus, when the valve 8 is shifted to a first shift position, the displacement adjusting device 23 is automatically loaded with high pressure and when the valve 8 is shifted to its second shift position, the displacement adjusting device 23 is automatically loaded with low pressure. Thus it is ensured that in the second shift position of the valve 8 the first hydromotor 9 cannot be adjusted in its displacement. A valve 27 supplies a displacement adjusting device 28, like the valve 22, with high pressure. Valves 29 and 30 are designed as proportional valves and connected with an electronic control unit whereby the adjusting devices 28 and 23, which are connected with valves 29 and 30, can be controlled and the displacement of the hydromotors 9 and 10 can thus be regulated. Likewise, a valve 31 is connected with the electronic control device and actuates the valve 8 in order to hydraulically uncouple the first hydromotor 9 from the high pressure.

To start with the drive mechanism, the valve 8 is in its first shift position whereby the common high-pressure line 2 is connected with the pressure-medium supply line 18 and the displacement of the pump 1 is enlarged whereby a torque builds up in the first hydromotor 9 and in the second hydromotor 10 and the output shaft 17 is driven by the first transmission part 12 and the second transmission part 14. By further increase of the displacement of the pump 1, the rotational speed of the output shaft 17 accelerates whereby the vehicle speed increases. The displacement, at least of one motor or of the first motor or of the second motor or of both motors, is then reduced whereby the rotational speed of the output shaft 17 is further increased. When reaching the maximum admissible rotational speed of the first motor 9, said first motor 9 is adjusted to zero displacement and the valve 31 is loaded by the electronic control unit so that the valve 8 is shifted to its second shift position and the pressure-medium supply line 18 is separated from the common high-pressure line 2. The adjusting device 23 is also simultaneously separated from the high pressure via the valve 22. Since the first hydromotor 9 has at this rotational speed zero displacement and no forces at all from the high pressure act upon the first hydromotor 9, it is possible further to accelerate the first hydromotor 9 above its maximum admissible rotational speed. This occurs by the fact that the displacement of the second hydromotor 10 has also been further reduced until the second hydromotor 10 reaches its minimal displacement. At the maximum flow rate of the pump 1 and minimum displacement of the second motor 10, the same as the first hydromotor 9 disengaged via the valve, the maximum rotational speed of the output shaft 17 is reached. When using a radial piston hydromotor with crankshaft and hydraulic adjustment in the crankshaft, the crankshaft rotates coaxially at maximum rotational speed whereby the pistons effect no stroke in the cylinders. The bearing forces of the hydromotor are sharply reduced, since the hydromotor is not loaded with the high pressure. It is thus unnecessary to disconnect the hydromotor mechanically from the output shaft 17. The valves 31 and 8 are shafted so that in a currentless state the first hydromotor 9 is disengaged from the common high-pressure line 2. The ratio of the first reduction gear part 12 and the ratio of the second reduction gear part 14 are laid out so that at the end of the working range of a wheel loader the first hydromotor 9 reaches its maximum admissible rotational speed and is uncoupled via the valve 8.

FIG. 2:

On the abscissa 32 is shown the vehicle speed or rotational speed of the output shaft 17 of FIG. 1 is shown and on the ordinate 33 are shown the displacements of the pump 1 of the first motor 9 and of the second motor 10 shown in FIG. 1. At the origin 34 the vehicle is stationary. The first motor 9 is at its maximum displacement, which is shown with a line 35. The second motor 10 is, likewise, at its maximum displacement shown with a line 36. By enlarging the displacement of the pump 1, the vehicle or the output shaft 17 accelerates, as shown with a line 37. At a point 38, the pump 1 has its maximum displacement which is not changed in the additional view to be seen on a line 39. Starting from a point 40, the displacement of the first motor diminishes as shown with a line 41. Thereby the vehicle accelerates further. Starting from a point 42, the displacement of the second motor 10, likewise, becomes reduced, which is shown in a line 43, whereby the vehicle accelerates further. At a point 44 the displacement of the first motor is adjusted to zero and the motor is separated from the high pressure via the valve 8 of FIG. 1. The rotational speed at the point 44 preferably corresponds to the maximum admissible rotational speed of the first hydromotor 9. Starting from a point 45, the second motor 10 alone is reduced in its displacement whereby the vehicle speed increases further, which can be seen in the line 46. At a point 47, the maximum speed of the vehicle is reached and the second motor 10 is at its maximum absorption volume. The rotational speed of the first motor 9 is at point 47 above its maximum admissible rotational speed. But the maximum admissible rotational speed is defined when the hydromotor is loaded with high pressure whereby the hydromotor can be accelerated above its maximum admissible rotational speed by its hydraulic disengagement and the adjustment of the hydromotor to zero absorption volume.

Figure 2:
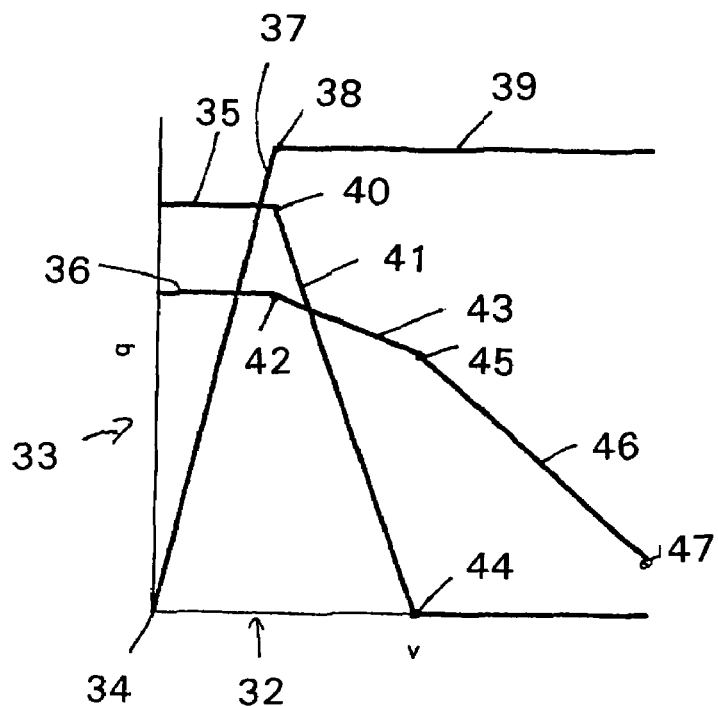
FIG. 2 is a diagram of the displacement via the output rotational speed or speed.
Figure 3:
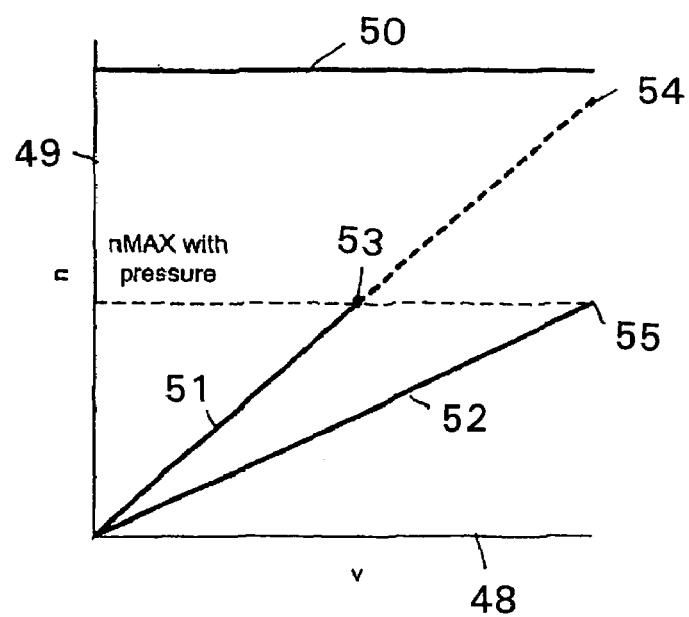
FIG. 3 is a diagram of the rotational speed via the output rotational speed or the vehicle speed.

FIG. 3:

On the abscissa 48 the speed or rotational speed of the output shaft 17 is also shown, as in FIG. 2. On an ordinate 49, the rotational speeds of the pump 1 of the first motor 9 and of the second motor 10 are shown. The pump 1 is driven at maximum rotational speed, which can be understood from a line 50. The rotational speed of the first hydromotor 9 increases by changing the absorption volume, as shown in FIG. 2, which is shown in a line 51. The rotational speed of the second motor 10 increases by changing the displacement, as shown in FIG. 2, whereby the road speed of vehicle increases, as shown on a line 52. The different gradients of the lines 51 and 52 result from the different ratios of the first transmission part 12 and of the second transmission part 14. At a point 53, the first motor 9 has reached its maximum rotational speed which in FIG. 2 corresponds to the point 44. Above the point 53, the hydromotor 9 is operated with zero displacement and disengaged high pressure. But the rotational speeds of the first hydromotor 9 and of the second hydromotor 10 increase up to the maximum rotational speed of the output shaft 17, points 54 and 55 showing the rotational speed at maximum output speed.

| Reference numerals |
| --- |
| 1 pump |
| 2 common high-pressure line |
| 3 common low-pressure line |
| 4 feed pump |
| 5 filter |
| 6 pressure-medium tank |
| 7 feed-pressure line |
| 8 first shut-off valve |
| 9 first hydromotor |
| 10 second hydromotor |
| 11 first gear wheel |
| 12 first reduction gear part |
| 13 first gear wheel |
| 14 second reduction gear part |
| 15 second gear wheel |
| 16 second gear wheel |
| 17 output shaft |
| 18 pressure-medium supply line |
| 19 pressure-medium return line |
| 20 line |
| 21 flush valve |
| 22 valve |
| 23 displacement adjusting device |
| 24 line |
| 25 line |
| 26 line |
| 27 valve |
| 28 displacement adjusting device |
| 29 valve |
| 30 valve |
| 31 valve |
| 32 abscissa |
| 33 ordinate |
| 34 origin |
| 35 line |
| 36 line |
| 37 line |
| 38 point |
| 39 line |
| 40 point |
| 41 line |
| 42 point |
| 43 line |
| 44 point |
| 45 point |
| 46 line |
| 47 point |
| 48 abscissa |
| 49 ordinate |
| 50 line |
| 51 line |
| 52 line |
| 53 point |
| 54 point |
| 55 point |
| 56 radiator |
| 57 line |

The invention claimed is:

1. A drive mechanism for a mobile vehicle having first and second hydromotors (9, 10) wherein at least one of the first and the second hydromotors is adjustable in its displacement and the first and the second hydromotors are in permanent operative connection with an output shaft (17), the first and the second hydromotors (9, 10) both being connected with a common high-pressure line (2), wherein a displacement of at least one of the first and the second hydromotors (9, 10) is adjustable to almost no displacement, and said at least one of the first and the second hydromotors (9, 10) is uncouplable from said common high-pressure line (2).

2. The drive mechanism for a mobile vehicle according to claim 1, wherein the output shaft (17) is driven by the first hydromotor (9), via a first reduction gear part (12), and by the second hydromotor (10), via a second reduction gear part (14).

3. The drive mechanism for a mobile vehicle according to claim 1, wherein said first hydromotor (9) has zero displacement above an admissible maximum rotational speed of the first hydromotor (9).

4. The drive mechanism for a mobile vehicle according to claim 2, wherein a ratio of said first transmission part (12) is higher than a ratio of said second transmission part (14).

5. The drive mechanism for a mobile vehicle according to claim 2, wherein said first reduction gear part (12) is a spur gear transmission and said second reduction gear part (14) is a spur gear transmission.

6. The drive mechanism for a mobile vehicle according to claim 1, wherein at the maximum rotational speed of the output shaft (17), the first hydromotor (9) is separated from the common high-pressure line (2) and adjusted to its zero displacement and the second hydromotor (10) is adjusted to its minimum displacement.

7. The drive mechanism for a mobile vehicle according to claim 1, wherein the drive mechanism is used in a working machine.

8. A drive mechanism for a mobile vehicle having first and second hydromotors (9, 10);

wherein at least one of the first and the second hydromotors has a displacement which is adjustable and the first and the second hydromotors are in permanent operative connection with an output shaft (17), the first and the second hydromotors (9, 10) are both connected with a common high-pressure line (2), the displacement of the at least one of the first and the second hydromotors is adjustable to substantially no displacement, and said at least one of the first and the second hydromotors (9, 10) is uncouplable from said common high-pressure line (2);

one valve (8) separates the first hydromotor (9) from the common high-pressure line (2) and connects a pressure-medium supply line (18) and a pressure-medium return line (19) of said first hydromotor (9) with one line (20) which is acted upon by one of a pressure of a feed pump (4) and a lubrication pressure of a line (57) after a radiator (56).

9. A drive mechanism for a mobile vehicle comprising:
a first hydromotor (9) for displacing hydraulic fluid;

a second hydromotor (10) for displacing hydraulic fluid; and an output shaft (17) being permanently operatively connected with the first and the second hydromotors (9, 10) and the first and second hydromotors (9, 10) both being connected with a common high-pressure line (2);

wherein at least the first motor hydromotor (9) has a variable displacement of hydraulic fluid and the variable displacement of hydraulic fluid of the first hydromotor (9) is adjustable to substantially zero hydraulic fluid displacement, and the first hydromotor (9) can be uncoupled from the common high-pressure line (2).

10. The drive mechanism for a mobile vehicle according to claim 9, wherein the first hydromotor (9) drives a first reduction gear part (12) which drives the output shaft (17), and the second hydromotor (10) drives a second reduction gear part (14) which drives the output shaft (17).

11. The drive mechanism for a mobile vehicle according to claim 10, wherein a ratio of the first reduction gear part (12) is higher than a ratio of the second reduction gear part (14).

12. The drive mechanism for a mobile vehicle according to claim 9, wherein the first hydromotor (9) displaces substantially no hydraulic fluid above an admissible maximum rotational speed.

13. The drive mechanism for a mobile vehicle according to claim 9, wherein one valve (8) separates the first hydromotor (9) from the common high-pressure line (2) and connects a pressure-medium supply line (18) and a pressure-medium return line (19) of the first hydromotor (9) with a first line (20) acted upon by a pressure of a feed pump (4).

14. The drive mechanism for a mobile vehicle according to claim 10, wherein the first reduction gear part (12) is a spur gear transmission and the second reduction gear part (14) is a spur gear transmission.

15. The drive mechanism for a mobile vehicle according to claim 9, wherein the first hydromotor (9) is separated from the common high-pressure line (2), the displacement of hydraulic fluid of the first hydromotor (9) is adjusted to substantially zero displacement, and the second hydromotor (10) is adjusted to a minimum displacement when the output shaft (17) reaches a maximum rotational speed.

16. The drive mechanism for a mobile vehicle according to claim 9, wherein the drive mechanism is used in a working machine.

17. The drive mechanism for a mobile vehicle according to claim 9, wherein one valve (8) separates the first hydromotor (9) from the common high-pressure line (2) and connects a pressure-medium supply line (18) and a pressure-medium return line (19) of the first hydromotor (9) with a first line (20) upon which acts lubrication pressure of a second line (57) after a radiator (56).

\* \* \* \* \*